US006914752B2

(12) United States Patent
Albrecht et al.

(10) Patent No.: US 6,914,752 B2
(45) Date of Patent: Jul. 5, 2005

(54) MAGNETIC RECORDING DISK DRIVE WITH CONTINUOUS CONTACT AIR-BEARING SLIDER

(75) Inventors: Thomas R. Albrecht, Au ZH (CH); Francis Chee-Shuen Lee, Cupertino, CA (US); Charles Mathew Mate, San Jose, CA (US); Tzong-Shii Pan, San Jose, CA (US); Robert N. Payne, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 146 days.

(21) Appl. No.: 10/400,210

(22) Filed: Mar. 26, 2003

(65) Prior Publication Data

US 2004/0190203 A1 Sep. 30, 2004

(51) Int. Cl.[7] .............................................. G11B 5/60
(52) U.S. Cl. ............................ 360/246.1; 360/246.2; 360/246.3; 360/235.4; 360/245.3
(58) Field of Search ........................ 360/246.1, 234.6, 360/234.3, 236.3, 235.5, 237.1, 294.7, 246.2, 246.3

(56) References Cited

U.S. PATENT DOCUMENTS

| | | | | |
|---|---|---|---|---|
| 6,212,032 | B1 * | 4/2001 | Park et al. ................ | 360/234.7 |
| 6,307,719 | B1 * | 10/2001 | Mallary .................... | 360/294.7 |
| 6,337,781 | B1 * | 1/2002 | Itoh .......................... | 360/236.8 |
| 6,411,468 | B1 * | 6/2002 | Park et al. ................ | 360/236.3 |
| 6,473,259 | B1 * | 10/2002 | Kuo et al. ..................... | 360/75 |
| 6,477,012 | B1 * | 11/2002 | Park et al. ................ | 360/236.1 |
| 6,493,188 | B1 * | 12/2002 | Tokisue et al. .......... | 360/245.1 |
| 6,501,625 | B1 * | 12/2002 | Boismier et al. ........ | 360/294.7 |
| 6,600,635 | B2 * | 7/2003 | Smith ....................... | 360/294.7 |
| 6,707,646 | B2 * | 3/2004 | Berger et al. ............ | 360/294.7 |
| 6,717,776 | B2 * | 4/2004 | Boutaghou ............... | 360/294.7 |
| 2002/0024769 | A1 | 2/2002 | Kohira et al. | |
| 2002/0024774 | A1 * | 2/2002 | Berger et al. ............ | 360/294.7 |
| 2002/0044371 | A1 * | 4/2002 | Bement et al. ................ | 360/75 |
| 2002/0126418 | A1 * | 9/2002 | Ueno et al. ............... | 360/235.7 |
| 2002/0191339 | A1 * | 12/2002 | Tokisue et al. .......... | 360/235.6 |

OTHER PUBLICATIONS

J. Itoh, et al., "An Experimental Investigation for Continuous Contact Recording Technology," IEEE Trans. on Magnetics, vol. 37, No. 4 Jul. 2001, p. 1806.

* cited by examiner

Primary Examiner—Jefferson Evans
(74) Attorney, Agent, or Firm—Thomas R. Berthold

(57) ABSTRACT

A magnetic recording disk drive achieves continuous contact recording with a head-suspension assembly that compensates for the moment generated from an adhesive force between the head carrier or slider and the disk. The slider pivot point, which is the point where the load force is applied to the flexure that supports the slider, is located closer to the front end of the slider than the net force applied by the air-bearing surface of the slider when the disk is rotating at its operational speed. This assures that the net air-bearing force generates a moment about the pivot point to partially counteract the flexure moment and the moment generated from the adhesive force between the disk and the slider's contact pad.

20 Claims, 6 Drawing Sheets

MAGNETIC RECORDING DISK DRIVE WITH CONTINUOUS CONTACT AIR-BEARING SLIDER

TECHNICAL FIELD

This invention relates in general to magnetic recording disk drives and in particular to a magnetic recording disk drive that uses an air-bearing slider for continuous contact recording.

BACKGROUND OF THE INVENTION

In conventional magnetic recording rigid disk drives, each of the read/write transducers (or heads) is supported on an air-bearing slider that rides on a cushion or bearing of air above the surface of its associated disk surface when the disk is rotating at its operating speed. The slider is connected to an actuator by means of a relatively fragile suspension. The suspension includes a gimbal or flexure that supports the slider and allows it to pitch and roll, and a load beam with a dimple or tip that applies a small force to bias the slider toward the disk surface. The slider has an air-bearing surface (ABS) designed to generate an air-bearing force to counteract the bias force from the load beam and thus assure that the slider "flies" above and out of contact with the disk surface.

More recently, continuous contact recording has been proposed that uses a head carrier in the form of a slider with an ABS that only partially supports the slider above the disk surface, with a rear portion of the slider that remains in contact with the disk surface during reading and writing of data. The interface between this type of continuous contact slider and the disk has been investigated by J. Itoh, et al., "An Experimental Investigation for Continuous Contact Recording Technology," *IEEE Trans. on Magnetics*, vol. 37, No. 4 July 2001, p. 1806. Continuous contact recording head-suspension assemblies have been described in published patent application US2002/0024769. However, the prior art teaches that the contact force on the slider during continuous contact recording is made up of only a repulsive reactive force acting normal to the disk surface and a friction force acting parallel to the disk surface. Thus attempts at continuous contact recording have resulted in unacceptable friction and wear of the slider and disk at the slider-disk interface.

What is needed is continuous contact recording disk drive that does not suffer from unacceptable wear of the slider and disk and the slider-disk interface.

SUMMARY OF THE INVENTION

The invention is based in part on the discovery that in a continuous contact recording slider-disk interface there is a significant adhesive force between the slider and disk that must be considered to successfully achieve continuous contact recording. The invention is a magnetic recording disk drive with a head-suspension assembly that provides continuous contact recording yet compensates for the moment generated from the adhesive force between the slider and the disk by generating a counteracting moment about the slider pivot point, which is the point where the load force is applied to the flexure that supports the slider. The pivot point is located closer to the front end of the slider than the net force applied by the air-bearing surface of the slider when the disk is rotating at its operational speed. This assures that the net air-bearing force generates a moment about the pivot point to partially counteract the flexure moment and the moment generated from the adhesive force between the disk and the slider's contact pad. The pivot point may be located between the midpoint and the front end of the slider body and the air-bearing surface may be designed and located to assure that the net air-bearing force is rearward of the slider pivot point. The pivot point may also be located at the slider body midpoint and the air-bearing surface designed with pads located approximately at the midpoint to assure that the net air-bearing force is rearward of the center-pivot point. An actuating element, such as a piezoelectric, electrostatic or thermal element, may be located on either the suspension load beam or the suspension flexure to increase or decrease the flexure moment to thereby adjust the counteracting effect of the net air-bearing force. The actuating element may also enable the slider to be unloaded or loaded to the disk. The head-suspension assembly thus minimizes the repulsive reacting force acting on the slider normal to the slider-disk interface and thereby minimizes the friction and wear of the slider contact pad and the disk at this interface.

For a fuller understanding of the nature and advantages of the present invention, reference should be made to the following detailed description taken together with the accompanying figures.

DETAILED DESCRIPTION OF THE INVENTION

Figure 1:
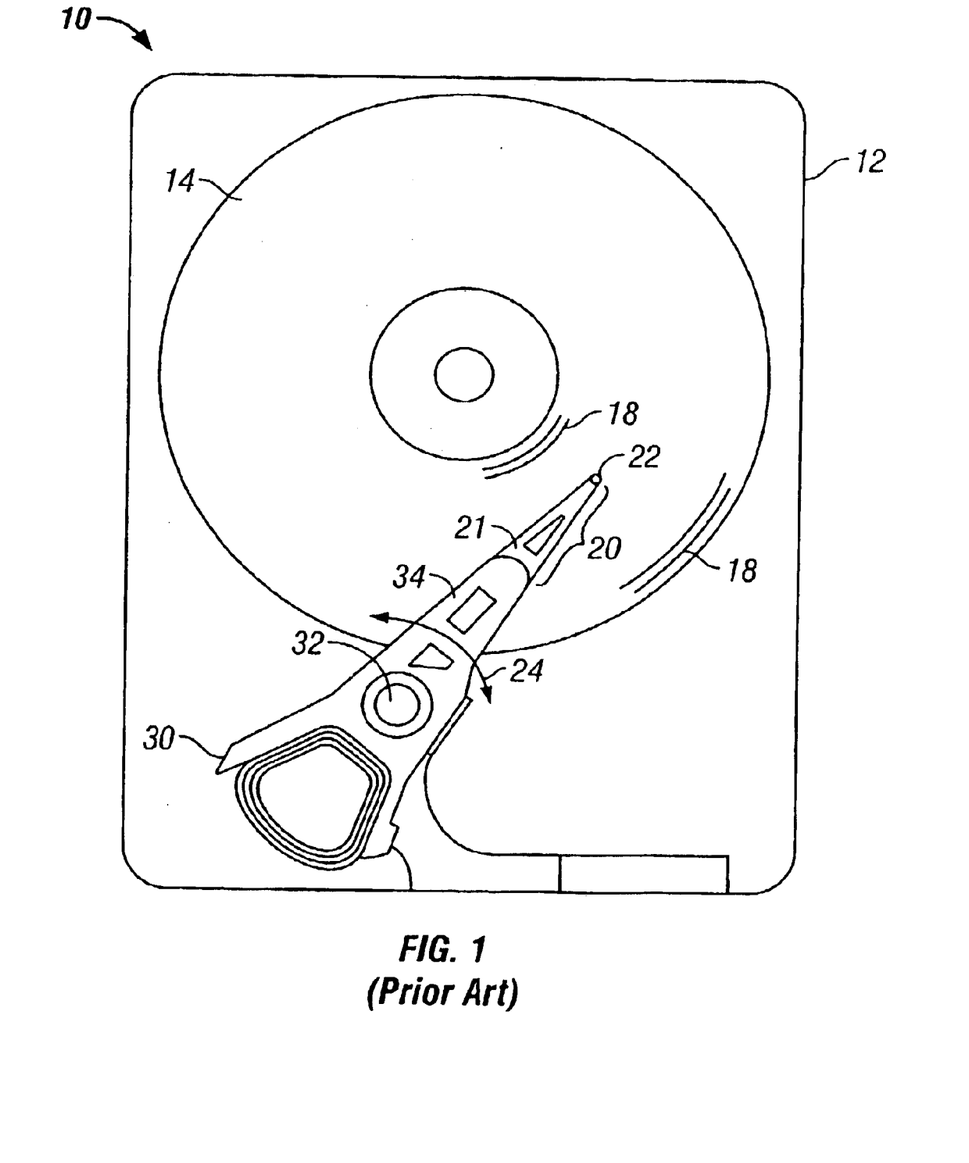
FIG. 1 is a top view of a prior art disk drive with the cover removed

FIG. 1 is a top view of a disk drive 10 with the cover removed. The drive 10 has a housing or base 12 that supports an actuator 30 and a drive motor for rotating magnetic recording disk 14. The actuator 30 is typically a voice coil motor (VCM) rotary actuator that has a rigid arm 34 and rotates about pivot 32 as shown by arrow 24. A head-suspension assembly 20 includes a suspension 21 that has one end attached to the end of actuator arm 34 and a head carrier, typically slider 22, attached to the other end of suspension 21. As the disk 14 rotates, the movement of actuator 30 allows the head on the trailing end of head carrier 22 to access different data tracks 18 on disk 14 for the recording and reading of data.

Figure 2:
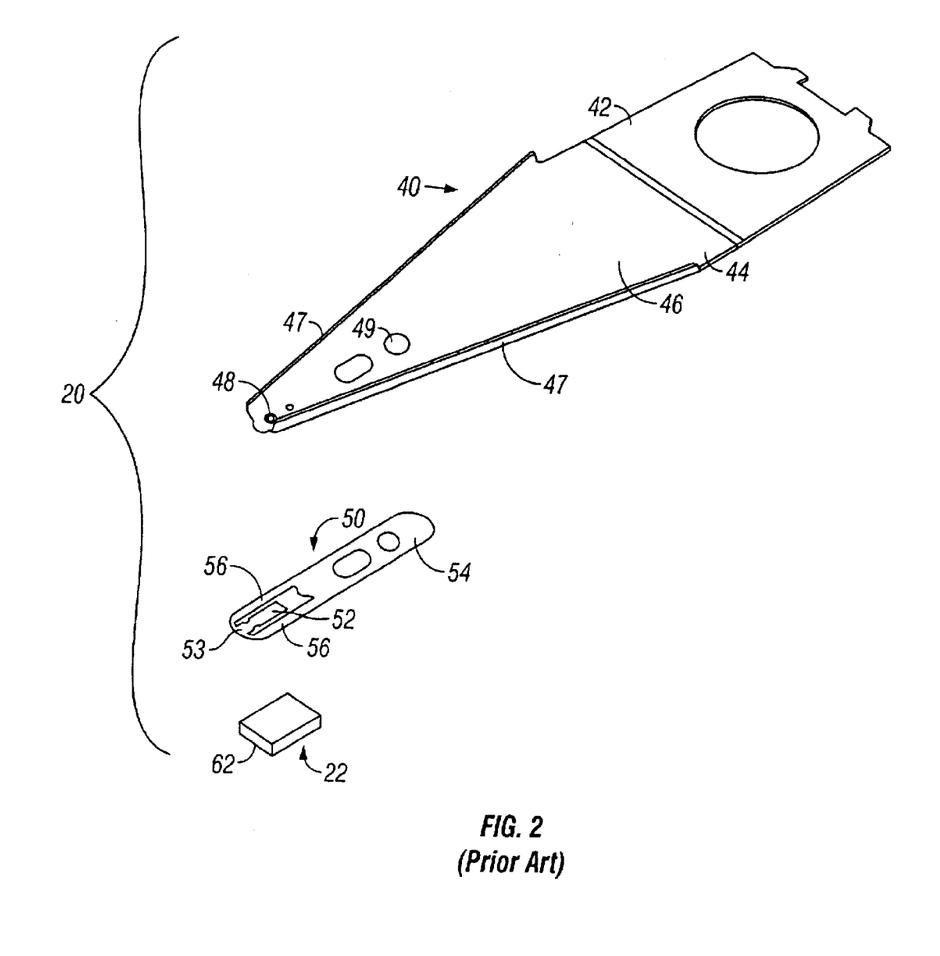
FIG. 2 is an exploded perspective view of a prior art head-suspension assembly in a disk drive.

FIG. 2 shows the head-suspension assembly 20 in more detail. The head suspension 21 includes a load beam 40 and a flexure 50. The load beam 40 has a rigid region 42 at least a portion of which is used for mounting the load beam to the actuator arm 34 (FIG. 1), a spring region 44, and a rigid section 46. The rigid section 46 includes stiffening rails 47 that enhance the stiffness and which are known to be provided in a variety of ways, including side rails as illustrated, and/or internal rails or channels. The stiffening rails 47 increase the longitudinal stiffness of the rigid section 46 to provide a force or load to the slider 22 at the tip 48 near the end of the load beam 40.

The flexure 50 provides a spring connection between slider 22 and the load beam 40 near the end of load beam 40. The flexure 50 permits the slider 22 to move in its pitch and roll directions to compensate for fluctuations of the rotating disk surface. Many different types of flexures, also known as gimbals, are known to provide the spring connection allowing for pitch and roll movement of the slider 22. Any flexure is contemplated to be used with the present invention. Illustrated is one specific example of a flexure 50 having a slider bond pad portion 52 to which the top side or upper surface of slider 22 can be attached, such as by the use of an adhesive. The slider bond pad portion 52 is typically provided from a cross piece 53 which is in turn connected to the mounting portion 54 of flexure 50 by arms 56. The flexure 50 is typically attached to load beam 40 by spot welding at the mounting portion 54. For alignment purposes, the load beam 40 is also provided with a tooling hole 49 for alignment with a similar hole of the mounting portion 54 of flexure 50 during assembly. The tip 48, also called a dimple, is provided at the end of load beam 40 providing a point load from the load beam 40 to the slider bond pad portion 52 to provide the requisite load to the slider 22 and to permit the pitch and roll movements of slider 22 and slider bond portion 52 about the tip 48. The tip 48 contacts the slider bond portion 52 at a point called the pivot point or gimballing point, which is the point about which the slider 22 pitches and rolls. The thin film read/write head (not shown) is formed on the trailing end 62 of slider 22.

Figure 3:
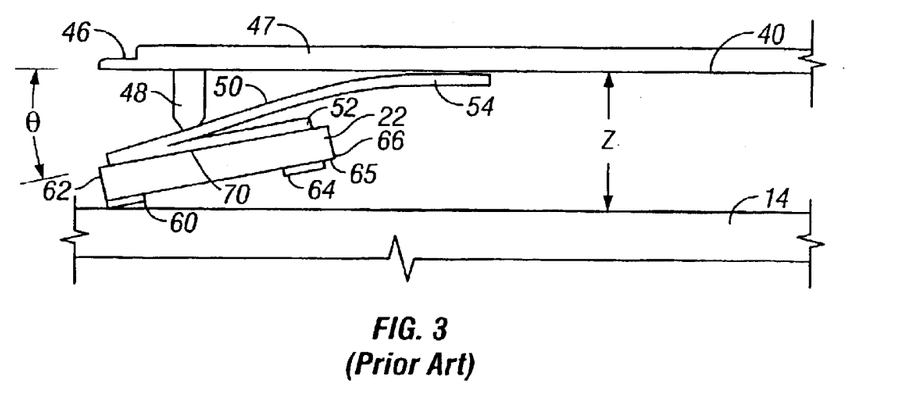
FIG. 3 is a side view of the head-suspension assembly showing the slider in contact with the disk for continuous contact recording in the manner as described in the prior art.

FIG. 3 is a side view of the head-suspension assembly showing the slider 22 in contact with the disk 14 for continuous contact recording in the manner as described in the prior art. The slider 22 includes a contact pad 60 near the slider trailing end 62 and flying pads 64 near the slider front end 66. There is typically an ion-milled compression step edge 65 between the front end 66 and the ABS of the flying pad 64 to provide an initial compression of the air flow and a more gradual change in air flow before the air reaches the flying pad 64. The load beam 40 is located a distance referred to as the Z-height from the disk 14. The tip 48 of the load beam 40 applies a load force at pivot point 70 located at the midpoint of slider 22 between the front end 66 and trailing end 62. If the slider is off the disk, the slider body makes an angle $\theta_0$ with respect to the load beam 40. This is a "positive pitch" position of the slider 22 (i.e., the front end 66 that faces the incoming air flow is pitched "up") and is required to assure that that the rear contact pad 60 establishes contact with the disk 14. When the slider 22 is on the disk 14, as shown in FIG. 3, the load force flexes the flexure 50 to move the slider to a smaller angle $\theta$. This results in a flexure moment proportional to the change in $\theta$, i.e., $(\theta_0-\theta)$, that acts about the pivot point 70. In a "load/unload" type of disk drive where the slider is "parked" on a ramp off the disk surface when the disk drive is not operating, the positive pitch angle of the slider 22 relative to the disk 14, as shown in FIG. 3, is also required during loading the slider onto the disk to ensure that the rear contact pad 60 contacts the disk first.

Figure 4:
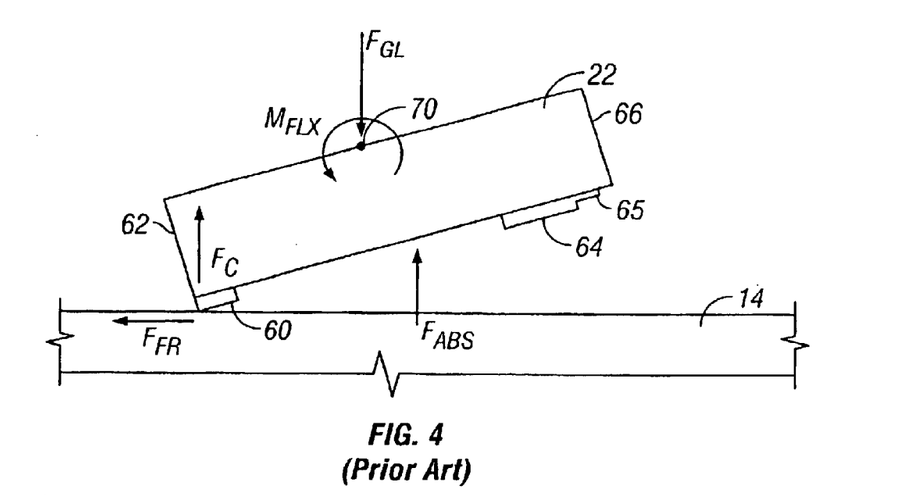
FIG. 4 is a side view of a continuous contact recording slider in contact with a disk illustrating the forces and moments acting on the slider as described in the prior art.
Figure 5A:
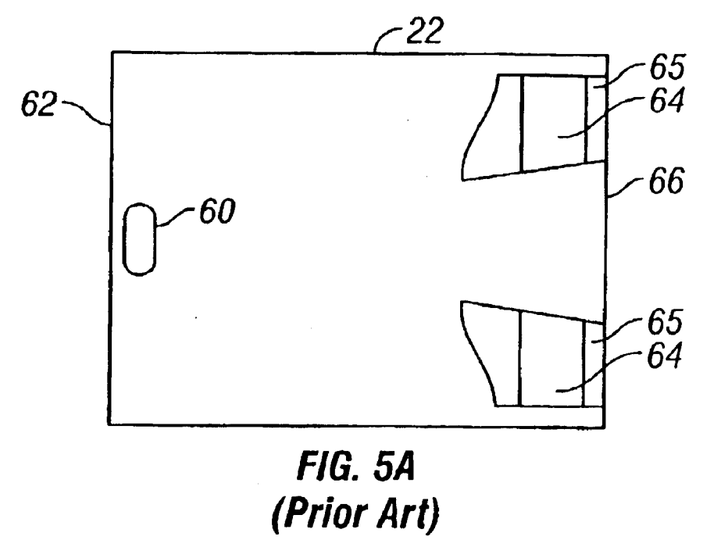
FIGS. 5A–5B show the disk sides of two representative prior art continuous contact recording sliders, illustrating the front flying pads and the rear contact pad.
Figure 5B:
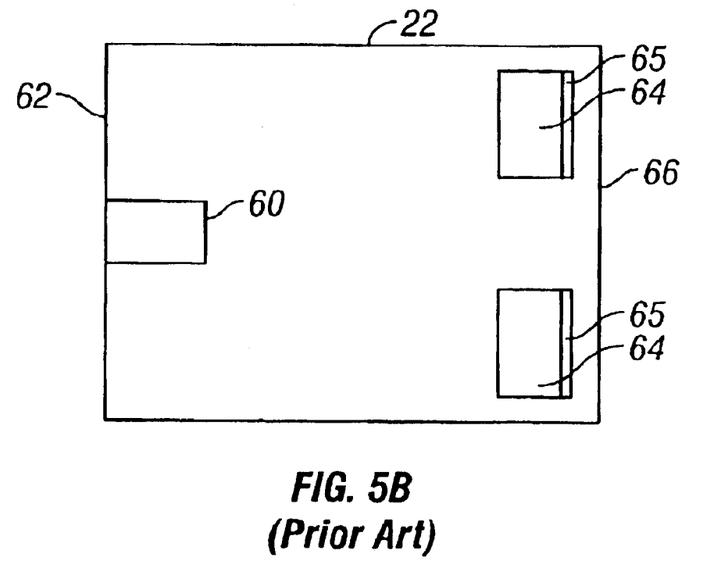

FIG. 4 shows the forces and moments acting on the continuous contact recording slider as described in the prior art, for example as shown in the previously cited US2002/0024769 publication. The gram load force $F_{GL}$ is counteracted by the sum of the net air-bearing force $F_{ABS}$ and the contact force $F_C$ from the disk. The slider's contact pad 60 is maintained in contact with the disk 14 as a result of the flexure moment $M_{FLX}$ and the moment about pivot point 70 caused by $F_{ABS}$. The slider's flying pads 64 are designed and located so that the $F_{ABS}$ is located forward of the pivot point 70 through which the load force $F_{GL}$ is acting. This ensures that the moment caused by the $F_{ABS}$ counteracts the moment from $F_C$ and the friction force $F_{FR}$, which would otherwise cause the contact pad 60 to move away from the disk 14. FIGS. 5A–5B show the disk side of two representative continuous contact recording sliders, illustrating the flying pads 64 (with step edges 65) and contact pad 60.

Preferred Embodiments

The prior art fails to consider the effect of adhesion forces between the contact pad of the continuous contact recording slider and the disk. The present invention is based in part on the discovery of this adhesion force and its importance to the proper design of a head-suspension assembly in a continuous contact recording disk drive. When the slider comes close to, i.e., less than approximately 10 nm, or contacts the disk surface, a substantial attractive or adhesive force pulls down on the part of the slider closest to the disk surface. This adhesive force can arise from a combination of sources, including Van der Waals interactions between the slider and disk, chemical bonding across the contacting interface, electrostatic forces from a bias voltage on either the slider or disk, such as caused by disk drive spindle motor charging or intentional application, electrostatic forces from the slider-disk contact potential, electrostatic forces from charges generated by rubbing the slider against the disk (tribocharging), and meniscus forces from lubricant or contaminant wicking up around the contact points.

Figure 6:
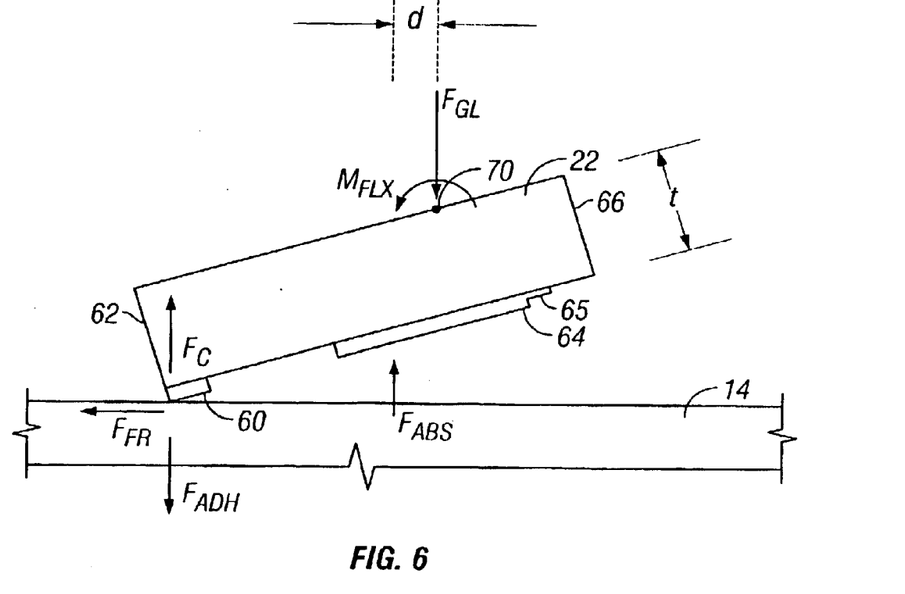
FIG. 6 is a side view of a continuous contact recording slider in contact with a disk according to the present invention illustrating the net air-bearing surface force $F_{ABS}$ acting on the slider to the rear of the pivot point.

In the present invention, the net air-bearing surface force $F_{ABS}$ acts on the slider to the rear of the pivot point, creating a moment that helps counter the moment about the pivot point by the adhesive force. This is illustrated in FIG. 6. The amount of gram load $F_{GL}$, which acts at the pivot point 70, and the overall center of air bearing force $F_{ABS}$ (including both negative and positive pressure components) in the fully loaded state are such that they result in a negative moment on the slider 22 which, when added to the negative friction moment caused by $F_{FR}$, exceeds the positive moment $M_{FLX}$ exerted by the flexure. This results in an "upward pull" on the rear contact pad 60 which counteracts a fraction of the positive moment from the adhesive force $F_{ADH}$ acting on the contact pad 60. The magnitude of the total net moment $(M_{FLX}+d^*F_{ABS}+t^*F_{FR})$ is chosen so that the reaction or contact force $F_C$ exerted by the disk 14 on the slider 22, which balances this total net moment, is at the target steady-state level. The present invention allows this target level to be set at a much lower level than earlier inventions.

FIG. 6 illustrates a first embodiment of the present invention wherein the pivot point 70 is located other than at the midpoint on the slider top side, preferably at a point between the midpoint and the slider front end 66. The locating of the pivot point more forward can be accompanied by a design of the ABS (flying pads 64) that moves the $F_{ABS}$ more rearward.

Figure 7:
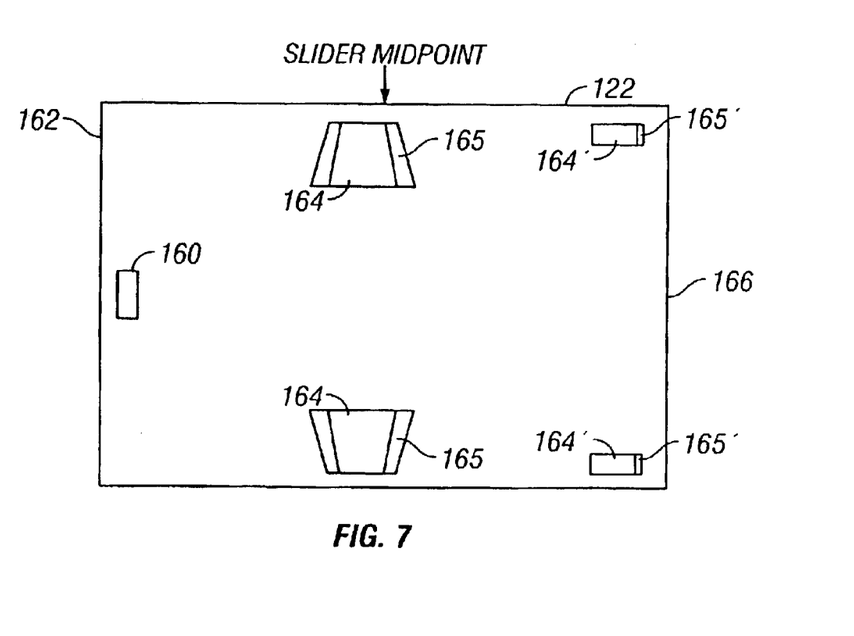
FIG. 7 shows the disk side of a center-pivot embodiment of the slider according to the present invention wherein the primary air-bearing force carrying pads are located slightly to the rear of the slider body centerline.

Because the slider midpoint is the pivot location for conventional head-suspension assemblies, locating the pivot point other than at the slider midpoint could cause major redesign of conventional commercially available suspensions and new development of the conductor leads and wire termination process required for electrical connection to the read/write head located on the slider trailing end 62. For this reason a second embodiment of the present invention is a center-pivot head-suspension assembly with an ABS design, as shown in FIG. 7, that locates the $F_{ABS}$ between the slider midpoint and the trailing end 162 of the slider 122. The disk side of the slider 122 for this embodiment is shown in FIG. 7, wherein smaller flying pads 164' (with step edges 165') are located near the front end 166 and larger flying pads 164 (with step edges 165) are located near the slider midpoint with the major portion of the total ABS area being located between the slider midpoint and the slider trailing end 162. Because the air-bearing force on a flying pad increases with increasing pad area and decreases with increasing spacing of the pad from the disk surface, it can be seen from FIG. 7 that the $F_{ABS}$ is located rearward of the slider midpoint. The location of the $F_{ABS}$ can be selected by changing the relative surface areas and locations of the pads 164' and 164.

The center-pivot embodiment shown in FIG. 7 utilizes a primary force carrying pad (or pads 164) located approximately at the slider body midpoint or centerline (the half-length measured from the slider front end 166). The small trailing contact pad 160 with no leading compression step edge is provided to support the read/write magnetic head elements near the trailing end 162. This small trailing contact pad 160 creates very little air-bearing force and also physically limits the maximum contact surface area. The small leading pad (or pads 164') are used to ensure some support of the slider's front end during loading of the slider on the disk and a small moment pitching the slider upward to ensure contact of the trailing contact pad 160. However, since the middle large pads 164 support most of the suspension load, the small front and rear pads can ensure a low pitch stiffness of the slider.

Figure 8:
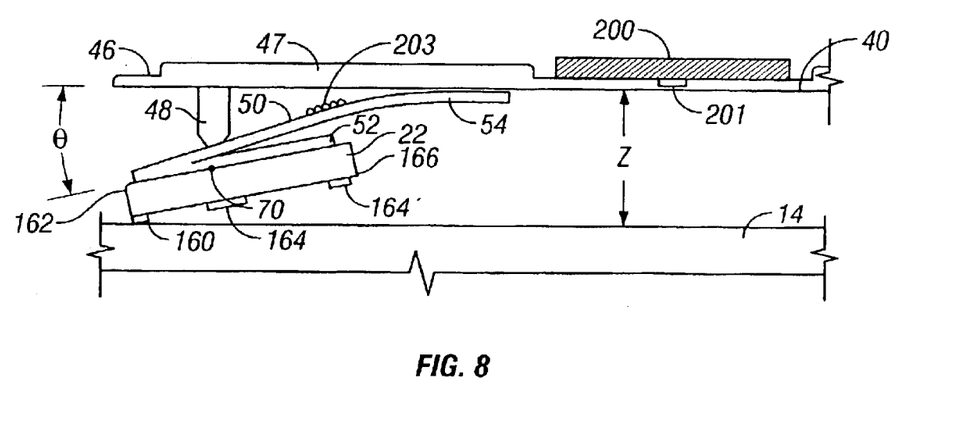
FIG. 8 is a side view of the head-suspension assembly according to the present invention showing the slider in contact with the disk and an actuating element on the suspension for moving the load beam tip.

In the embodiments described above it may be desirable to provide an actuating element on either the load beam or the flexure for changing the angle the slider makes relative to the suspension, and thereby changing $M_{FLX}$. FIG. 8 illustrates these two alternative actuating elements: either element 200 located on the load beam 40, or element 203 located on the flexure 50. Activation of the element 200, shown at a thinned "hinge" region 201, will cause the element to bend, moving the tip 48 downward and decreasing θ to thereby increase the moment exerted by the flexure $M_{FLX}$. This would also be desirable to "reload" the slider onto the disk if for some reason the contact pad 160 came out of contact with the disk 14, such as might occur if the adhesion force decreased. If load beam element 200 is used instead of flexure element 203 it may also be located at the hinge region between suspension regions 44 and 42 (see FIG. 2). If flexure element 203 is used, activation of it will decrease the angle θ. The actuating elements may be piezoelectric, electrostatic or thermal. The actuating elements may also be used to move the tip 48 away from the flexure 50 or to reduce the angle θ to thereby reduce $M_{FLX}$ or to unload the slider from the disk. For example, a bimorph type of piezoelectric material, such as commercially available PZT5H from Morgan Advanced Ceramics, located at a hinge region would enable bidirectional movement. Similarly, a thermal element located on each side of the load beam 40 near a hinge region would enable both clockwise and counterclockwise rotation, by heating one or the other of the thermal elements, and thus bidirectional movement of tip 48. The thermal elements may be formed of brass/steel bimetallic strip and attached to the suspension by epoxy or welding. A piezoelectric actuator for a suspension load beam is described in U.S. Pat. No. 6,501,625.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A disk drive having a rotatable disk with a magnetic recording layer and a head for reading data from or recording data to the magnetic recording layer on the disk, the disk drive comprising:
    a carrier for the head and having a top side, a disk side, a front end and a trailing end, the carrier having an air-bearing surface on the disk side and a contact pad on the disk side near the trailing end;
    an actuator for moving the carrier across the disk; and
    a suspension connecting the carrier to the actuator and comprising a flexure attached to the top side of the carrier and a load beam attached to the flexure and having a tip contacting the top side of the carrier at a pivot point, the carrier having a positive pitch with its front end higher above the disk than its trailing end if the contact pad is not in contact with the disk, the load beam applying a force to urge the carrier contact pad to contact the disk and the flexure applying a flexure moment about the pivot point to urge the carrier contact pad to contact the disk, wherein the pivot point is located approximately at a midpoint between the carrier front end and the carrier trailing end and closer to the front end of the carrier than the net force applied by the air-bearing surface of the carrier when the disk is rotating at its operational speed, and wherein the major portion of the air-bearing surface is located closer to a midpoint between the carrier front end and the carrier trailing end than to the carrier front end; whereby said net air-bearing force generates a moment about the pivot point to partially counteract the flexure moment and the moment generated from the adhesive force between the disk and the carrier contact pad.

2. The disk drive of claim 1 further comprising an actuating element attached to the suspension for changing the angle of the carrier relative to the suspension.

3. The disk drive of claim 2 wherein the actuating element is located on the flexure.

4. The disk drive of claim 2 wherein the actuating element moves the load beam tip in a direction generally perpendicular to the carrier top side to thereby change said angle.

5. The disk drive of claim 2 wherein the actuating element is a piezoelectric element.

6. The disk drive of claim 2 wherein the actuating element is an electrostatic element.

7. The disk drive of claim 2 wherein the actuating element is a thermal element.

8. The disk drive of claim 1 wherein the air-bearing surface comprises a plurality of air-bearing pads.

9. A disk drive head-suspension assembly comprising:
    a slider having a top side, a disk side, a front end and a trailing end, the slider having an air-bearing surface on the disk side and a contact pad on the disk side near the trailing end, the major portion of the air-bearing surface of the slider being located between the slider trailing end and the slider midpoint; and
    a suspension comprising a flexure attached to the top side of the slider and a load beam attached to the flexure, the slider being supported by the suspension with a positive pitch with its front end closer to the load beam than its trailing end, the load beam having a tip contacting the top side of the slider at a pivot point and the flexure applying a flexure moment about the pivot point to urge the slider contact pad toward the disk, the pivot point being located closer to the front end of the slider than the net force from the air-bearing surface of the slider.

10. The assembly of claim 9 wherein the pivot point is located closer to the slider front end than to the slider trailing end.

11. The assembly of claim 9 further comprising an actuating element attached to the suspension for bending the suspension.

12. The assembly of claim 11 wherein the actuating element is located on the flexure.

13. The assembly of claim 11 wherein the actuating element moves the load beam tip in a direction generally perpendicular to the slider top side.

14. The assembly of claim 11 wherein the actuating element is a piezoelectric element.

15. The assembly of claim 11 wherein the actuating element is an electrostatic element.

16. The assembly of claim 11 wherein the actuating element is a thermal element.

17. The assembly of claim 9 wherein the air-bearing surface comprises a plurality of pads, one of said pads being a contact pad near the trailing end of the slider.

18. The assembly of claim 9 further comprising a read/write head located on the slider near the slider trailing end.

19. A disk drive having a rotatable disk with a magnetic recording layer and a head for reading data from or recording data to the magnetic recording layer on the disk, the disk drive comprising:

a carrier for the head and having a topside, a disk side, a front end and a trailing end, the carrier having an air-bearing surface on the disk side and a contact pad on the disk side near the trailing end, the contact pad contacting the disk during reading and recording of data;

an actuator for moving the carrier across the disk, and a suspension connecting the carrier to the actuator and comprising a flexure attached to the top side of the carrier and a load beam attached to the flexure and having a tip contacting the top side of the carrier at a pivot point, the carrier having a positive pitch with its front end higher above the disk than its trailing end if the contact pad is not in contact with the disk, the load beam applying a force to urge the carrier contact pad to contact the disk and to maintain the contact pad in contact with the disk during reading and recording of data and the flexure applying a flexure moment about the pivot point to urge the carrier contact pad to contact the disk, wherein the pivot point is located closer to the front end of the carrier than the net force applied by the air- bearing surface of the carrier when the disk is rotating at its operational speed; whereby said net air-bearing force generates a moment about the pivot point to partially counteract the flexure moment and the moment generated from the adhesive force between the disk and the carrier contact pad.

20. The disk drive of claim 19, wherein the pivot point is located closer to the carrier front end than to the carrier trailing end.

* * * * *